No. 723,609. PATENTED MAR. 24, 1903.
N. KALISCHER.
CAN OPENER.
APPLICATION FILED MAY 10, 1902.
NO MODEL.
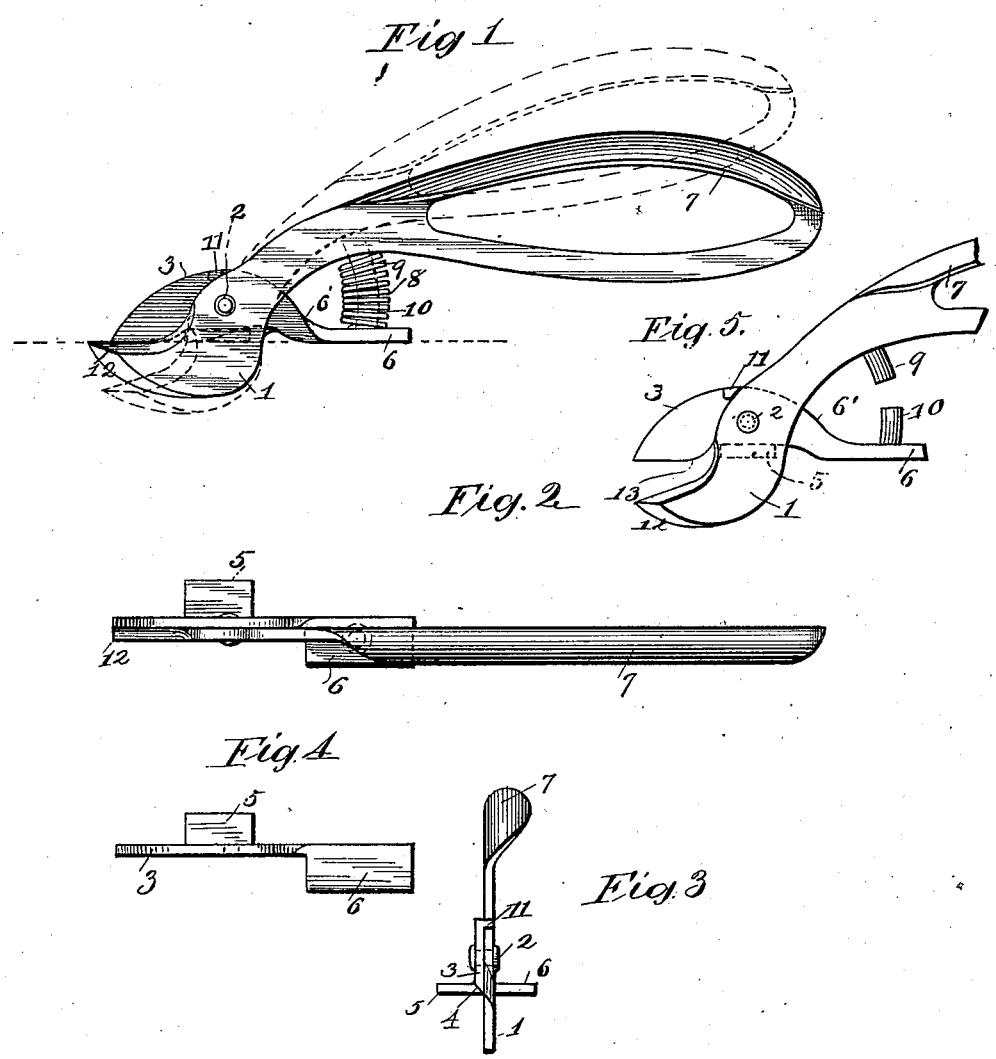

UNITED STATES PATENT OFFICE.

NATHAN KALISCHER, OF CLEVELAND, OHIO.

CAN-OPENER.

SPECIFICATION forming part of Letters Patent No. 723,609, dated March 24, 1903.

Application filed May 10, 1902. Serial No. 106,793. (No model.)

*To all whom it may concern:*

Be it known that I, NATHAN KALISCHER, a citizen of the United States, and a resident of Cleveland, county of Cuyahoga, State of Ohio, (post-office address, 174 Ontario street,) have invented certain new and useful Improvements in Can-Openers, of which I hereby declare the following to be a full, clear, and exact description, such as will enable others skilled in the art to which it appertains to make and use the same.

My invention relates to improvements in can-openers; and the objects of the invention are to provide a double-bladed cutter which will not bend the tin, but will make a clean incision as the tool is forced forward, which cannot slip or be thrown out of the tin by the pressure employed in the cutting, and which will instantly grip the tin as soon as the tool is inserted.

My invention consists in the cutting-blades, one of which is provided with a handle and the other with a bearing or fulcrum plate, with the details of construction and combination and arrangement of the various parts, as hereinafter described, shown in the accompanying drawings, and specifically pointed out in the claims.

In the accompanying drawings, Figure 1 is a side elevation of the device, the line of the top of the can being shown in dotted line. Fig. 2 is a plan view thereof. Fig. 3 is an end view of the same, showing the cutting edges; and Fig. 4 is a plan view of the upper blade. Fig. 5 shows a side view of the device with the blades opened to show the initial gripping edges.

In the views, 1 is the lower blade, pivoted at 2 above the line of the tin to the upper blade 3. The upper blade is provided with the sharp cutting edge 4 and also with the lateral extensions 5 and 6. The extension 5 is turned to the right and is near the front of the blade and prevents the tool from being inserted too far into the tin. The extension 6 is integral with the rear extremity 6', which rests upon the tin and forms a fulcrum-plate upon which the lower blade, which is provided with an upwardly-curved handle 7, works. This extension is preferably turned to the left underneath the handle, so as to constantly engage the surface of the can, since with small cans it might extend over the edge thereof if it extended to the right. A coiled spring 8 serves to keep the blades extended for use, and stop-pins 9 and 10 serve to retain the spring. A small stop 11 prevents the blades from opening so far as to release the spring from the pins. The lower blade terminates in a sharp edge or point 12. This point extends somewhat in advance of the lower blade both for ready insertion in the tin and also to run in advance of the upper blade underneath the tin and prevent the lower blade from lifting up and out of the tin as the pressure is brought to bear on the long handle. This is a very desirable feature, since with the single-bladed can-openers now in use the lower blade often slips out of the tin and the hand is badly torn on the rough edge of the tin.

This device is most conveniently made of a good quality of sheet-steel that can be tempered and can be ground to a sharp edge.

The upper edge of the handle is seen bent over for convenience and an opening made therein to receive and protect the fingers, and the lateral extensions can be bent easily from the plate forming the upper blade. The stop-pins can also be formed of integral portions of the sheet metal.

In Fig. 5 is seen the curved inner edges of the blades, the upper one acting to seize the tin when it is pressed between the curved surfaces and give a strong initial grip and prevent slipping.

Having described my invention, what I claim as new, and desire to secure by Letters Patent, is—

1. In a can-opener, the combination with a sheet-metal upper blade provided with right and left lateral extensions, one in front and the other in the rear, of a sheet-metal lower blade pivoted thereto above the division-line of the blades, and provided with an upwardly-curved handle and a spring between said handle and the rear extension of the lower blade.

2. In a can-opener, an upper blade, a rear extension and lateral plate integral therewith, a lateral stop-plate upon the opposite side of the blade, a lower blade pivoted thereto above the meeting-line of the blades, and an upwardly-curved handle for said blade.

3. In a can-opener, an upper blade, a short rear extension therefor, a lateral plate integral therewith, a lateral plate extending from the side of the blade, a straight cutting edge at the front of the blade, an upwardly-turned cutting edge at the rear of the blade in combination with a lower blade pivoted to the upper blade above the cutting-line, a projecting point to said blade beyond the upper blade, a straight cutting edge to said lower blade and a curved cutting inner edge, and an upwardly-curved handle for said lower blade, substantially as described.

In testimony whereof I have signed my name to this specification in the presence of two subscribing witnesses.

NATHAN KALISCHER.

Witnesses:
C. H. OLDS,
WM. M. MONROE.